United States Patent Office 2,759,641
Patented Aug. 21, 1956

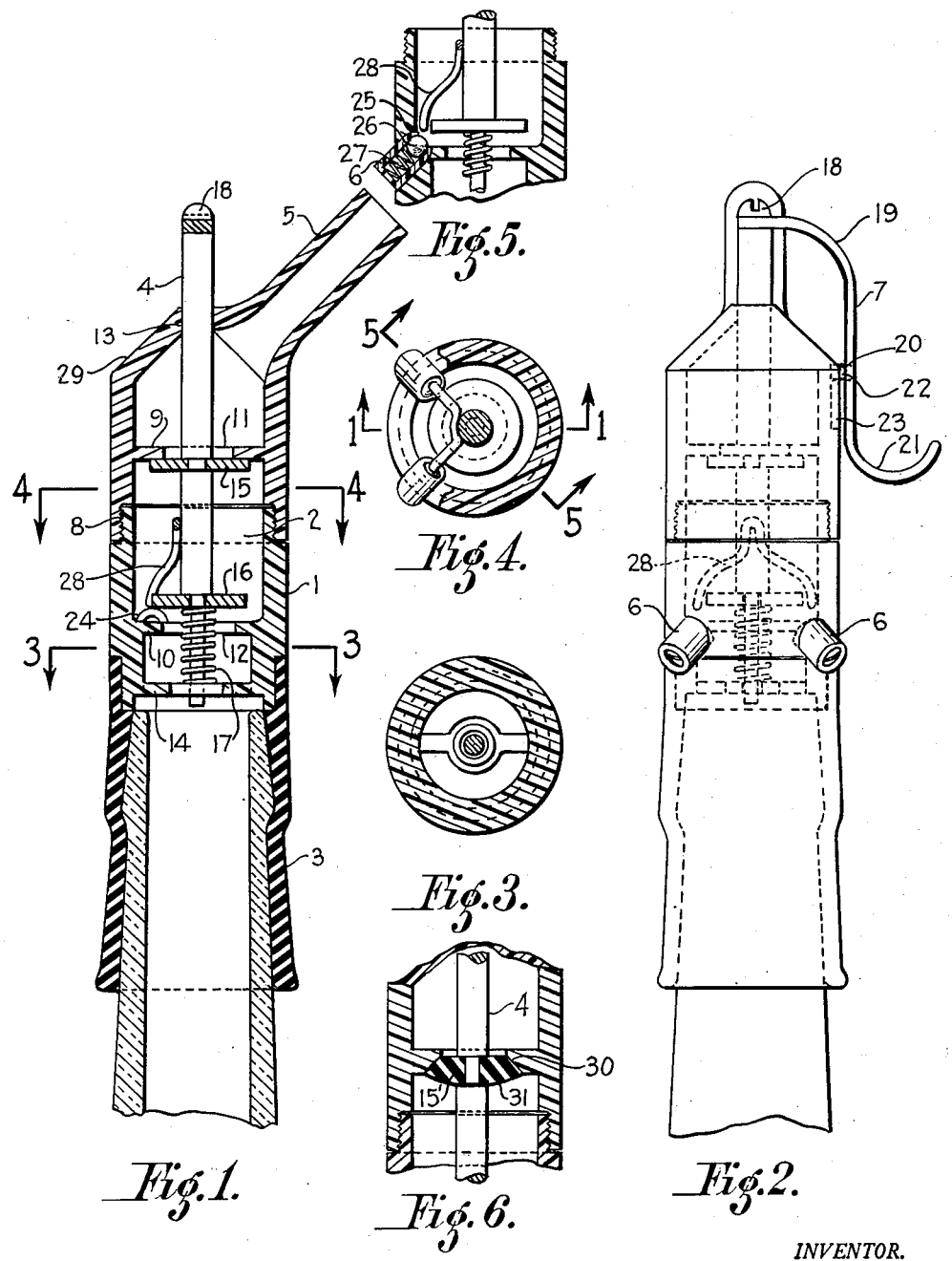

2,759,641
LIQUID MEASURING AND DISPENSING DEVICE
David Hersh, San Francisco, Calif.

Application February 25, 1952, Serial No. 273,300

1 Claim. (Cl. 222—442)

The present invention relates to improvements in a liquid measuring and dispensing device, and its principal object is to provide a device for dispensing liquid in measured quantities from a bottle or the like.

A further object of my invention is to provide a device of the character described which allows the operator to dispense measured quantities of the liquid in rapid succession, with the bottle held in inverted position, the device being made to dispense upon the pull on a trigger-like handle and to automatically re-fill upon release of the handle, without the necessity of tilting or otherwise changing the position of the bottle between operations.

It is still further proposed to provide a device of the character described comprising a measuring chamber adapted for mounting over the neck of a bottle or the like, double-acting valve means adapted to connect the chamber with the bottle for filling operations and with a spout for dispensing operation and vent means operable to pass air into the chamber during dispensing operations and from the chamber into the bottle during filling operations.

And finally it is proposed to provide a simple means for securing the chamber upon the bottle neck, a trigger-like handle for operating the valve mechanism mounted upon the outside of the chamber, guide means for the handle, and means whereby the latter guide means is made to also serve as a positioning means for the vent operating means.

Further objects and advantages of my invention will appear as the specification proceeds, and the new and novel features of my dispensing device will be fully defined in the claim attached hereto.

The preferred forms of my invention are illustrated in the accompanying drawing forming part of this application, in which:

Figure 1 shows a vertical, central section through my dispensing device, as applied to the neck of a bottle;
Figure 2, a side elevation of the same;
Figure 3, a horizontal section taken along line 3—3 of Figure 1;
Figure 4, a horizontal section taken along line 4—4 of Figure 1;
Figure 5, a fragmentary vertical section showing the detail of the vent structure, taken along line 5—5 of Figure 4; and
Figure 6, a fragmentary detail view, in vertical section, of a modified form of dispensing valve.

While I have shown only the prefered forms of my invention, it should be understood that various changes or modifications may be made within the scope of the claim hereto attached without departing from the spirit of the invention.

Referring to the drawing in detail, my invention comprises in its principal features, a cylindrical housing 1 having a measuring chamber 2, rubber tubing 3 for securing the housing upon a bottle neck, a valve mechanism for the chamber including a valve stem 4, a spout 5 at the upper end of the housing, a pair of vents 6 and a handle 7 for operating the valve stem.

The housing 1 is here shown as being cylindrical, although it may be of any other suitable form. It is made in two parts threaded together in the middle portion of the housing, as at 8.

The housing has two horizontal partitions 9 and 10, one in the upper section and one in the lower section, and each partition is formed with a central valve opening, as at 11 and 12. The two partitions form the measuring chamber 2.

The tube 3 is preferably made of rubber or similar material, is normally cylindrical, but follows the shape of the bottle neck when applied, as shown. It is secured upon the bottom end of the housing in any suitable manner, as by gluing.

The valve stem 4 extends centrally through the housing, its upper end being guided in the top of the housing, as at 13, and its reduced bottom end being guided in a spider 14 located near the bottom of the housing.

The stem has two valve heads 15 and 16 mounted thereon, within the chamber, the spacing between the valve heads being somewhat less than the spacing between the partitions, so that, when the stem is in its uppermost position, the upper valve head 15 closes the valve opening 11, while the lower valve head uncovers the valve opening 12.

When the stem is pressed downward, the lower valve head 16 closes the lower valve opening 12, while the upper valve head 15 uncovers the valve opening 11.

A coiled spring 17 bearing against the spider 14 and the lower valve head 16 normally urges the valve head upward, as shown.

The upper end of the valve stem has the handle 7 secured thereon, as by a screw 18, the handle being curved downward, as at 19, continuing downward in a straight stretch 20, paralleling the housing and terminating in a trigger 21 convenient for operation by a person holding the bottle by the neck in upside down position.

The straight stretch 20 of the handle has a pin 22 projecting into a vertical groove 23 in the housing wall to guide the handle vertically and to position the valve stem against rotary movement.

The housing is formed, immediately above the lower partition 10, the upper edge of which is curved into the wall of the housing, as at 24, with a pair of spaced vents 6 projecting downwardly at a slant, as shown, each vent carrying a valve seat 25, a ball valve 26 seated thereon and a spring 27 bearing on the valve for normally seating the same.

The vents are spaced from one another, and the inner ends extend into the edge curvature 24, within the confines of the cylindrical housing so as to render the balls operable by vertically descending prongs 28 fixed upon the stem and suitably curved to strike the balls on the downward movement of the stem. The prongs are positioned on the stem in such a manner as to line up with the balls in the vents when the pin 22 of the handle rides in the groove 23.

The upper end of the housing may be tapered, as at 29, or suitably curved, and the spout 5 may be made to curve into the upper end in any suitable manner calculated to offer as little resistance as possible to the flow of the liquid therethrough.

In use, assuming that the bottle is filled and that a number of small containers are to be filled in rapid succession, the operator first turns the bottle upside down, in substantially vertical position.

With the stem 4 in the position shown, the bottom valve 16 open, and the top valve 15 closed, and the vent valves closed, liquid will flow into the chamber 2, which is measured to desired proportions, as one ounce, the air normally within the chamber bubbling into the bottle to replace the liquid.

Now, the operator, grasping the trigger 21 of the handle, and holding the spout over a container to be filled, pulls on the trigger to open valve 15 and close valve 16, thus discharging the measured amount of liquid from the chamber 2 into the container. This operation also causes the prongs 28 to open the vents 6, allowing air to stream into the chamber to compensate for the liquid discharged.

As soon as the chamber is emptied, the operator releases the handle, with the result that the parts return to the position shown in the drawing, with the upper valve closed, the lower valve open and the vents closed. The chamber will now automatically re-fill, with the air from the chamber bubbling into the bottle.

Thus, the operator may rapidly proceed from container to container, with the bottle retaining its inverted position, and the only action necessary on the part of the operator being the alternate operation and release of the trigger.

Figure 6 shows a slightly modified valve structure, in which the valve opening is tapered, as at 30, and the valve head 15' is similarly tapered and rounded in its outer surface, as at 31, to provide for a smoother flow of the liquid. The same structure may, of course, be used in connection with the lower valve.

I claim:

A liquid measuring and dispensing device comprising a rigid cylindrical housing section having a flexible hollow tube at its lower end for securing the same vertically upon the neck of a bottle or the like, and having a horizontal partition, with an opening to form a valve seat, and having a central bearing below said partition, a valve stem having a lower end slidable in said bearing and having a valve fixed thereto above said valve seat, spring means between the bearing and the valve and within the housing section for normally urging the valve away from its seat, a second valve fixed on the stem in spaced relation to the first valve, and a second similar cylindrical housing section of substantially the same length and diameter as the first section and having a lower end threaded upon the first section and having a closed upper end with an off-set spout therein and with a central bearing for the stem and having a valve seat above the second valve and having a vertical guide groove in the outer surface thereof, the two valve seats of the two housing sections forming a measuring chamber and the valves being spaced on the stem for closing one of the valve seats or the other, with the spring serving to normally close the upper valve, and the housing and the tube having substantially the same outer diameter and presenting an extended and unobstructed cylindrical gripping surface, a vent in the lower housing section adjacent its partition and leading directly to the atmosphere and having a spring-pressed valve therein, a prong on the stem operable to open the vent valve when the stem is depressed for closing the lower valve, and co-operative means on the stem and the housing for guiding the prong including a handle fixed on the top of the stem and curved to extend downwardly along the outside of the housing, and a pin on the handle and slidable in the groove.

References Cited in the file of this patent

UNITED STATES PATENTS

| 2,093,365 | Ransom | Sept. 14, 1937 |
| 2,216,347 | Humbard | Oct. 1, 1940 |
| 2,248,958 | Christensen | July 15, 1941 |

FOREIGN PATENTS

| 352,073 | France | May 22, 1905 |
| 17,962 | Great Britain | July 29, 1914 |
| 486,434 | Great Britain | June 1, 1938 |
| 567,957 | Great Britain | Mar. 9, 1945 |